United States Patent
Zhou et al.

(10) Patent No.: US 11,743,836 B2
(45) Date of Patent: Aug. 29, 2023

(54) REDUCTION OF PATH LOSS (PL) REFERENCE SIGNAL (RS) APPLICATION TIME

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/114,024

(22) Filed: Dec. 7, 2020

(65) Prior Publication Data
US 2021/0185617 A1    Jun. 17, 2021

Related U.S. Application Data

(60) Provisional application No. 62/948,077, filed on Dec. 13, 2019.

(51) Int. Cl.
*H04W 52/22* (2009.01)
*H04W 52/24* (2009.01)
(Continued)

(52) U.S. Cl.
CPC ......... *H04W 52/242* (2013.01); *H04L 5/0048* (2013.01); *H04W 52/146* (2013.01); *H04W 52/54* (2013.01); *H04W 72/23* (2023.01)

(58) Field of Classification Search
CPC ..... H04W 52/08; H04W 52/10; H04W 36/30; H04W 4/40; H04W 24/02; H04W 52/22
See application file for complete search history.

(56) References Cited

U.S. PATENT DOCUMENTS

2007/0207756 A1    9/2007  Qi et al.
2017/0367116 A1*  12/2017  Li .................. H04W 72/048
(Continued)

FOREIGN PATENT DOCUMENTS

EP    1830496 A1    9/2007
EP    2109236 A2   10/2009
WO    2004054135 A1  6/2004

OTHER PUBLICATIONS

Huawei., et al., "Beam Reporting for Beam Management", 3GPP TSG RAN WG1 Meeting #90, 3GPP Draft; R1-1713757, 3rd Generation Partnership Project (3GPP), Mobile Competence Centre ; 650, Route Des Lucioles ; F-06921 Sophia-Antipolis Cedex ; France vol. RAN WG1, No. Prague, Czech Republic; Aug. 21, 2017-Aug. 25, 2017, Aug. 20, 2017 (Aug. 20, 2017), 11 Pages, XP051316556, Retrieved from the Internet: URL: http://www.3gpp.org/ftp/Meetings_3GPP_SYNC/RAN1/Docs/ [retrieved on Aug. 20, 2017], The whole document.

(Continued)

*Primary Examiner* — Tu X Nguyen
(74) *Attorney, Agent, or Firm* — Danai Nelisile Mhembere; Patterson & Sheridan, LLP

(57) ABSTRACT

Aspects of the present disclosure provide apparatus, methods, processing systems, and computer readable mediums for reducing path loss reference signal (PL RS) application time. An example method generally includes receiving signaling indicating activation of path loss (PL) reference signals (RSs), determining that the UE can reduce an application time for using the PL RS for uplink power control purposes, wherein the reduced application time is reduced relative to a non-reduced application time, and using PL RS measurements taken according to the reduced application time for uplink power control.

26 Claims, 8 Drawing Sheets

(51) Int. Cl.
*H04L 5/00* (2006.01)
*H04W 52/54* (2009.01)
*H04W 52/14* (2009.01)
*H04W 72/23* (2023.01)

(56) References Cited

U.S. PATENT DOCUMENTS

2020/0205085 A1* 6/2020 Li .................... H04W 16/28
2022/0104160 A1* 3/2022 Tang ................ H04W 56/0045

OTHER PUBLICATIONS

International Search Report and Written Opinion—PCT/US2020/063768—ISA/EPO—dated Apr. 21, 2021.

* cited by examiner

REDUCTION OF PATH LOSS (PL) REFERENCE SIGNAL (RS) APPLICATION TIME

CROSS-REFERENCE TO RELATED APPLICATIONS

This application claims benefit to U.S. Provisional Patent Application Ser. No. 62/948,077, entitled "Reduction of Path Loss (PL) Reference Signal (RS) Application Time," filed Dec. 13, 2019 and assigned to the assignee hereof, the contents of which are hereby incorporated by reference in its entirety.

TECHNICAL FIELD

Aspects of the present disclosure relate to wireless communications, and more particularly, to techniques for reducing application time of path loss (PL) reference signal (RS) activation.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes receiving signaling indicating activation of path loss (PL) reference signals (RSs), determining that the UE can reduce an application time for using the PL RS for uplink power control purposes, wherein the reduced application time is reduced relative to a non-reduced application time, and using PL RS measurements taken according to the reduced application time for uplink power control.

One innovative aspect of the subject matter described in this disclosure can be implemented in a method for wireless communication by a network entity. The method generally includes sending, to a user equipment, signaling indicating activation of path loss (PL) reference signals (RSs), determining that the UE can reduce an application time for using the PL RS for uplink power control purposes, wherein the reduced application time is reduced relative to a non-reduced application time, and transmitting PL RS for the UE to measure according to the reduced application time for uplink power control.

One innovative aspect of the subject matter described in this disclosure can be implemented in an apparatus for wireless communication by a user equipment (UE). The apparatus generally includes a receiver configured to receive signaling indicating activation of path loss (PL) reference signals (RSs), and a processor configure to determine that the UE can reduce an application time for using the PL RS for uplink power control purposes, wherein the reduced application time is reduced relative to a non-reduced application time and use PL RS measurements taken according to the reduced application time for uplink power control.

One innovative aspect of the subject matter described in this disclosure can be implemented in an apparatus for wireless communication by a network entity. The apparatus generally includes a transmitter configured to send, to a user equipment, signaling indicating activation of path loss (PL) reference signals (RSs), and a processor configured to determine that the UE can reduce an application time for using the PL RS for uplink power control purposes, wherein the reduced application time is reduced relative to a non-reduced application time, wherein the transmitter is further configured to transmit PL RS for the UE to measure according to the reduced application time for uplink power control.

One innovative aspect of the subject matter described in this disclosure can be implemented in an apparatus for wireless communication by a user equipment (UE). The apparatus generally includes means for receiving signaling indicating activation of path loss (PL) reference signals (RSs), means for determining that the UE can reduce an application time for using the PL RS for uplink power control purposes, wherein the reduced application time is reduced relative to a non-reduced application time, and means for using PL RS measurements taken according to the reduced application time for uplink power control.

One innovative aspect of the subject matter described in this disclosure can be implemented in an apparatus for wireless communication by a network entity. The apparatus generally includes means for sending, to a user equipment, signaling indicating activation of path loss (PL) reference signals (RSs), means for determining that the UE can reduce an application time for using the PL RS for uplink power control purposes, wherein the reduced application time is reduced relative to a non-reduced application time, and means for transmitting PL RS for the UE to measure according to the reduced application time for uplink power control.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for reducing path loss (PL) reference signal (RS) application time.

The following description provides examples of reducing PL RS application time, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
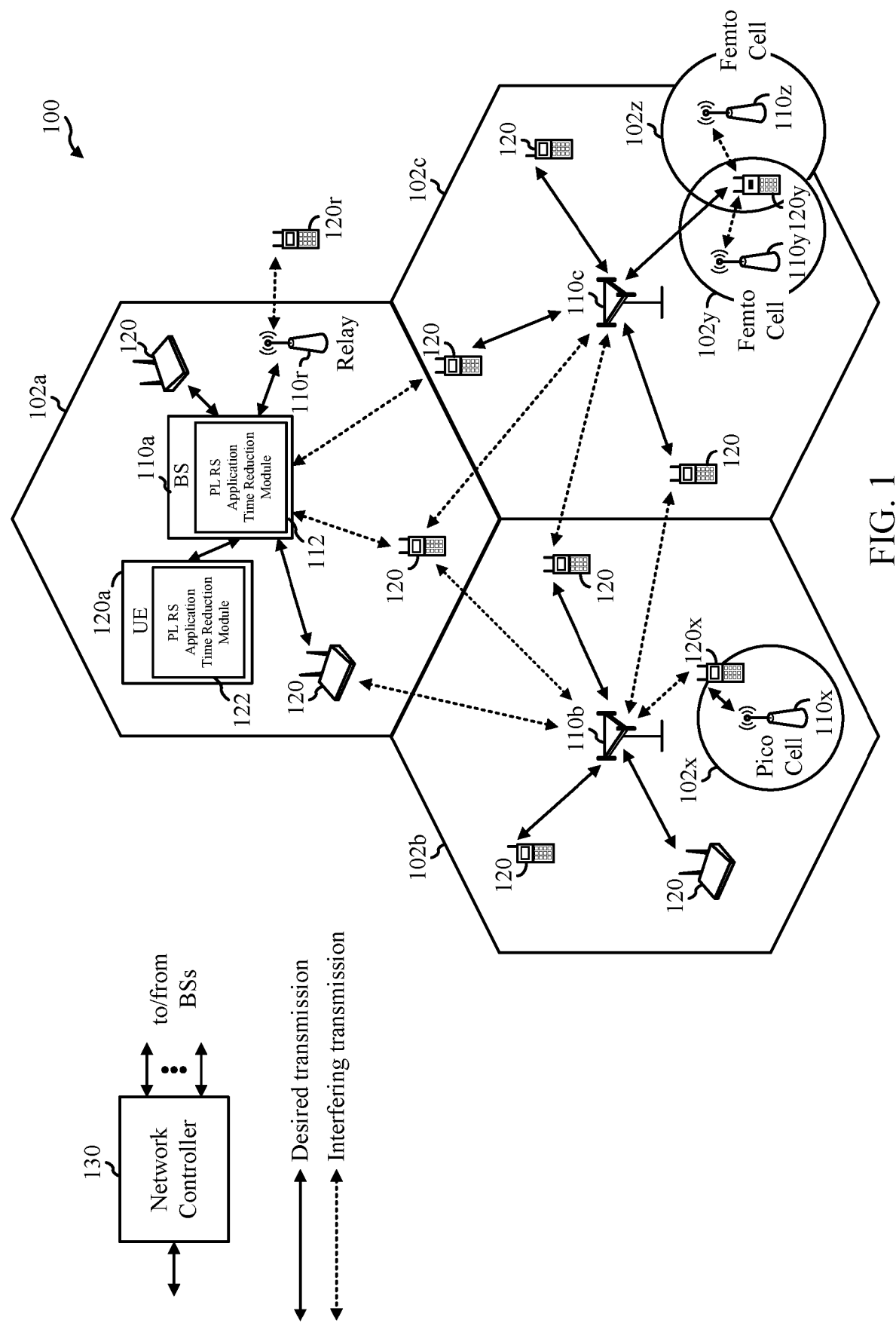
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a PL RS Application Time Reduction Module 122 that may be configured to perform (or cause UE 120a to perform) operations 400 of FIG. 4. Similarly, base station 110a may include a PL RS Application Time Reduction Module 112 that may be configured to perform (or cause BS 110a to perform) operations 500 of FIG. 5.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
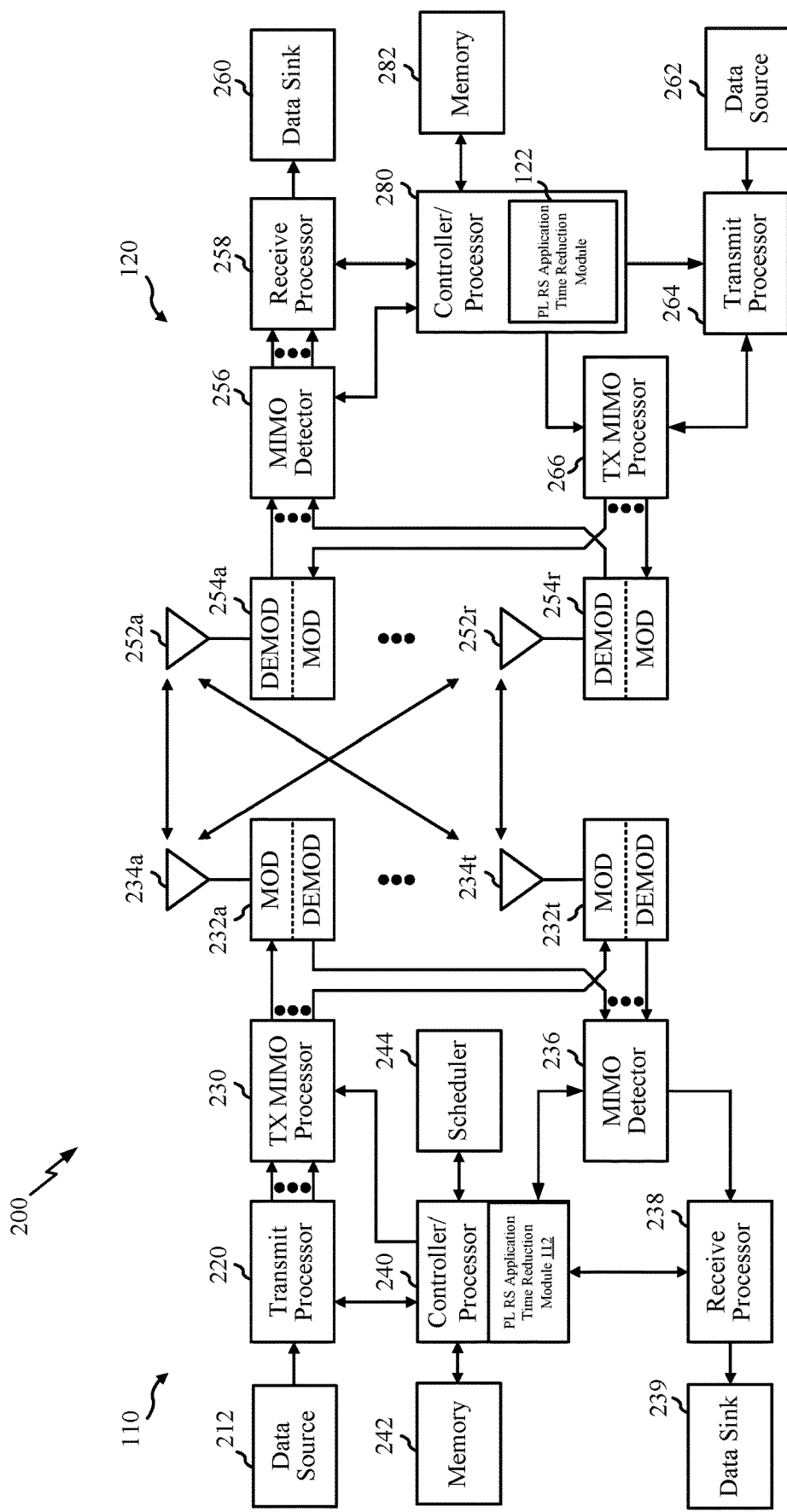
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a PL RS Application Time Reduction Module 122 that may be configured to perform operations 400 of FIG. 4, while the controller/processor 240 of the BS 110 has a PL RS Application Time Reduction Module 112 that may be configured to perform operations 500 of FIG. 5, as discussed in further detail below. Although shown at the Controller/Processor, other components of the UE or BS may be used to perform the operations described herein.

Figure 3:
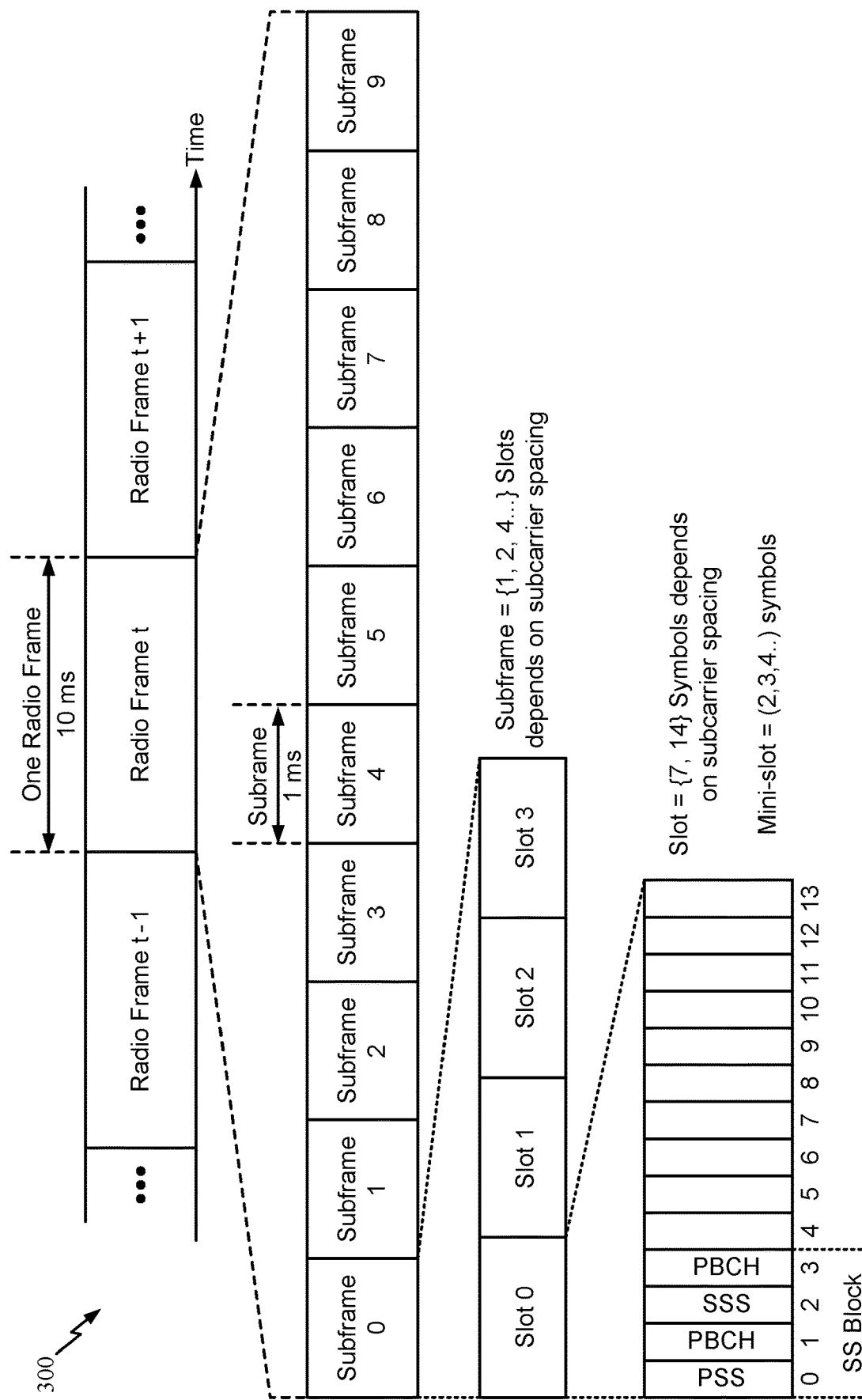
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Reducing Path Loss (PL) Reference Signal (RS) Application Time Aspects of the present disclosure provide apparatus, methods, processing systems, and computer readable mediums for reducing path loss (PL) reference signal (RS) application time. As used herein, the term application time generally refers to the amount of time before a UE may use a PL RS measurement (e.g., for uplink power control purposes). As will be described in greater detail below, the application time may depend on a number of PL RS samples received by a UE, for example, to allow for sufficient filtering and/or a period with which the PL RS is transmitted.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 µSec, while in FR4 with 960 kHz, the slot length is 15.6 µSec.

In multi-beam operation (e.g., involving FR1 and FR2 bands), more efficient uplink/downlink beam management may allow for increased intra-cell and inter-cell mobility and/or a larger number of transmission configuration indicator (TCI) states. For example, the states may include the use of a common beam for data and control transmission and reception for UL and DL operations, a unified TCI framework for UL and DL beam indication, and enhanced signaling mechanisms to improve latency and efficiency (e.g., dynamic usage of control signaling).

Some features may facilitate UL beam selection for UEs equipped with multiple panels. For example, UL beam selection may be facilitated through UL beam indication based on a unified TCI framework, enabling simultaneous transmission across multiple panels, and enabling fast panel selection. Further, UE-initiated or L1-event-driven beam management may also reduce latency and the probability that beam failure events occur.

Additional techniques for multi-TRP deployment may target both FR1 and FR2 bands. These techniques may improve reliability and robustness for channels other than the PDSCH (e.g., PDCCH, PUSCH, and PUCCH) using multi-TRP and/or multi-panel operations. These enhancements may enable inter-cell multi-TRP operations and may allow for simultaneous multi-TRP transmission with multi-panel reception.

In some cases, media access control (MAC) control elements (CEs) may be used to activate PL RSs. In other cases, DCI may be used to activate PL RSs. Generally, PL RSs may be downlink signals transmitted from a network entity (e.g., a gNodeB) to a UE and may be used by a UE to determine power control parameters for uplink transmissions. These power control parameters may be used for uplink power control for PUSCH and/or SRS transmissions by a UE, among other uplink transmissions.

In either case, a newly activated PL RS may not be immediately ready to use until after some number of samples (e.g., after 5 PL RS samples from the end of an ACK for the activation MAC-CE or DCI) which may depend on filtering techniques used by the UE. In some cases, the application time can be relatively long. For example, if application is after 5 PL RS samples, and if PL RS has large periodicity (e.g., 20 ms), application time can be 100 ms or more. Thus, the application of power control parameters to uplink transmissions based on the newly activated PL RS may be delayed for some amount of time, during which time communications between the UE and the network entity may use outdated power control parameters that may result, for example, in a failure to receive uplink transmissions until the power control parameters are applied at the UE.

Aspects of the present disclosure provide various options for reducing path loss (PL) reference signal (RS) application time.

Figure 4:
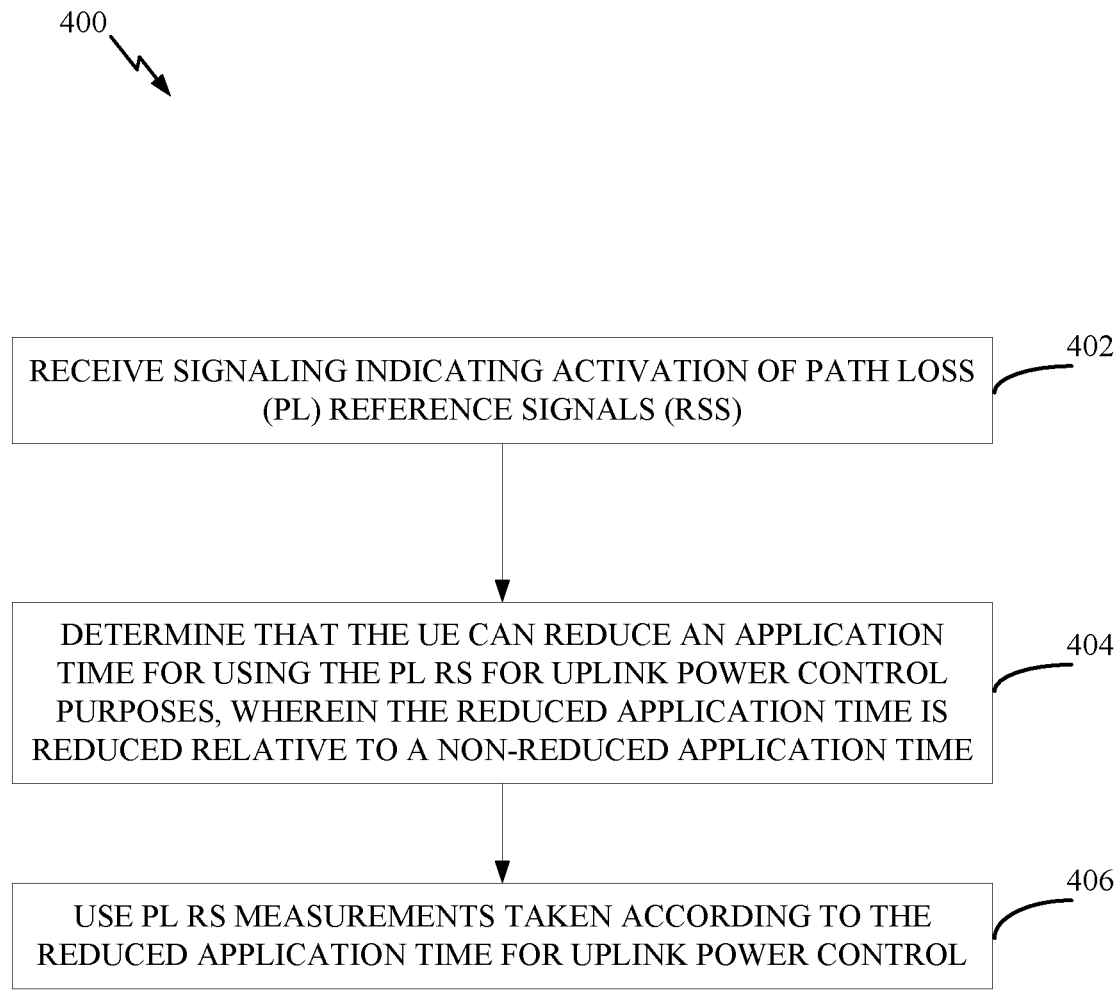
FIG. 4 illustrates example operations for wireless communication by a user equipment (UE), in accordance with some aspects of the present disclosure.

FIG. 4 illustrates example operations 400 for wireless communication by a UE, in accordance with some aspects of the present disclosure. For example, operations 400 may be performed by a UE 120a of FIG. 1 to reduce PL RS application time.

Operations 400 begin, at 402, by receiving signaling indicating activation of path loss (PL) reference signals (RSs). The signaling indicating activation of PL RSs may be carried in downlink control information (DCI), a medium access control (MAC) control element (CE), radio resource control (RRC) signaling, or the like. Generally, indications carried in higher layer signaling (e.g., DCIs in PHY layer signaling, MAC CEs, etc.) may impose less processing overhead than indications carried in lower layer signaling (e.g., RRC signaling). Generally, activation of PL RSs may include an indication that PL RSs will be transmitted to the UE and that the UE is to measure the PL RSs for various purposes. For example, activation of PL RSs may indicate that the UE is to measure the PL RSs and use the measurements for uplink power control and/or other purposes, as discussed in further detail below.

At 404, the UE determines that the UE can reduce an application time for using the PL RS for uplink power control purposes. Generally, the reduced application time is reduced relative to a non-reduced application time. A non-reduced application time may be, for example, an application time defined by a number of PL RS samples to be measured prior to applying the PL RSs for uplink power control purposes and a periodicity between each PL RS sample, and the reduced application time may be a portion of the non-reduced application time.

At 406, the UE uses PL RS measurements taken according to the reduced application time for uplink power control.

Figure 5:
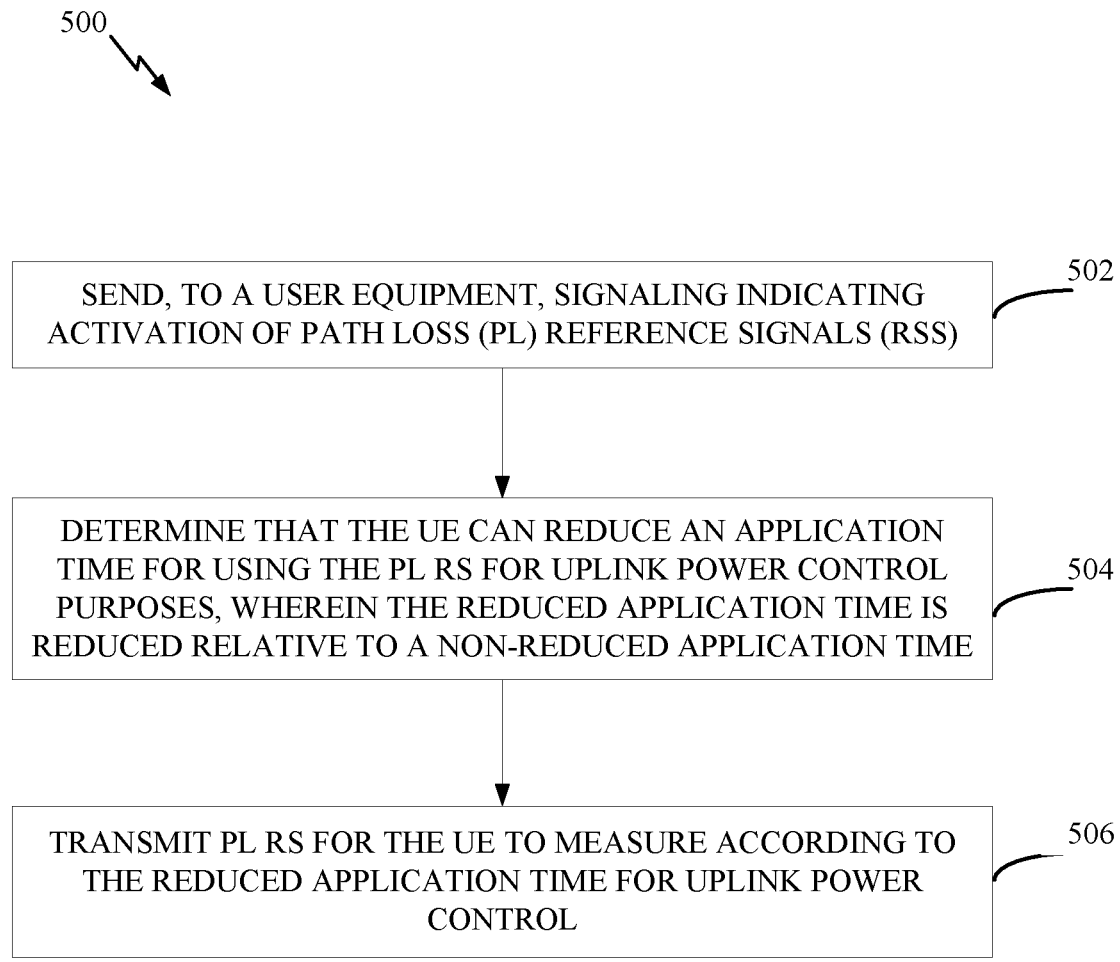
FIG. 5 illustrates example operations for wireless communication by a network entity, in accordance with some aspects of the present disclosure.

FIG. 5 illustrates example operations 500 for wireless communication by a network entity, in accordance with some aspects of the present disclosure. For example, operations 500 may be performed by a gNodeB 110 of FIG. 1 to reduce PL RS application time (by a UE performing operations 400).

Operations 500 begin, at 502, by sending, to a user equipment, signaling indicating activation of path loss (PL) reference signals (RSs).

At 504, the network entity determines that the UE can reduce an application time for using the PL RS for uplink power control purposes, wherein the reduced application time is reduced relative to a non-reduced application time.

At 506, the network entity transmits PL RS for the UE to measure according to the reduced application time for uplink power control.

PL RS application time may be reduced in various manners, as discussed in further detail below.

In one example, a newly activated PL RS may be transmitted with a shorter ("on demand") periodicity for some time from the end of ACK for the activation MAC-CE, so UE can measure 5 samples in a duration shorter than a normal PL RS period. That is, a same number of PL RS samples may be measured in a reduced application time and a non-reduced application time, though the periodicity at which the PL RS samples are measured may be reduced, and the total time over which the PL RS samples may be reduced.

To enable on demand periodicity, and the corresponding reduced application time, for each PL RS, the gNB may configure two periods: a shorter period and a longer period. The shorter period may be used for X samples, for example, from the end of an ACK. In some cases, the shorter period may have a periodicity of 10 milliseconds or less. After X PL RS samples, the longer period may be used. This longer period may have, for example, a periodicity greater than 10 milliseconds. In some cases, the shorter period may be used for uplink power control, while the longer period may be used for other purposes.

In another example, the UE may reduce a PL RS application time by using a smaller number of PL RS samples for uplink power control. In such a case, instead of applying the newly activated PL RS after a conventional number of samples (e.g., 5), the UE can apply the PL RS earlier (e.g., 3 samples). In some cases, the UE may indicate the earlier application time to gNB. In some cases, the UE can determine the earlier application time based on estimated measurement accuracy. For example, a smaller number of samples—and a corresponding earlier application time—may be sampled if the UE observes an insignificant amount of variation amongst some number of consecutive samples (e.g., if the observed variation of the 3 samples is within some threshold amount of variation). In another example, the UE may determine that an earlier PL RS application time is warranted if the UE has low mobility (e.g., is stationary or substantially stationary). A UE may determine that it is stationary or substantially stationary, for example, based on location information obtained from a satellite positioning system (e.g., NAVSTAR GPS, GLONASS, GALILEO, etc.) or other location services indicating that the UE has remained within a defined area over a period of time.

In still another example, a conventional number of samples (e.g., 5) can be overwritten by the UE capability, which can indicate that fewer samples (e.g., 3) are to be used to apply PL RSs and determine power control parameters for use in uplink transmissions by the UE to the gNB based on the PL RSs. In this case, the UE may signal, to the gNB, its capability for reduced PL RS application time and/or the reduced number of samples corresponding to the reduced application time.

The techniques described herein may be applied to PL RSs, in some cases, with the assumption that PL RSs for AP-SRS/SP-SRS can be activated/updated via a MAC CE and/or DCI. In some cases, a UE can be configured with multiple PL RSs (e.g., via RRC signaling). One of the multiple PL RSs may subsequently be activated/updated via the MAC CE and/or DCI for a SRS resource set.

In some cases, a UE may reuse higher layer filtered RSRP for path loss measurement, with applicable timing after activation (as noted above). Filtered RSRP values for previous path loss RS may be used before the application time (e.g., the next slot after the $5^{th}$ measurement sample for conventional non-reduced application time or after the $3^{rd}$ sample for reduced application time), where the $1^{st}$ measurement sample corresponds to be the $1^{st}$ instance, e.g., 3 ms after sending ACK for the MAC CE. In some cases, these assumptions may only be applicable for UEs supporting the number of RRC-configurable path loss RSs larger than 4, and this is only for the case that the activated PL RS by the MAC CE is not tracked. This is because a UE may only need to track the activated PL RS if there are more than four PL RSs configured via RRC signaling. The UE may determine whether to update the filtered RSRP value for the previous PL RS 3 ms after sending an ACK for the MAC CE.

Figure 6:
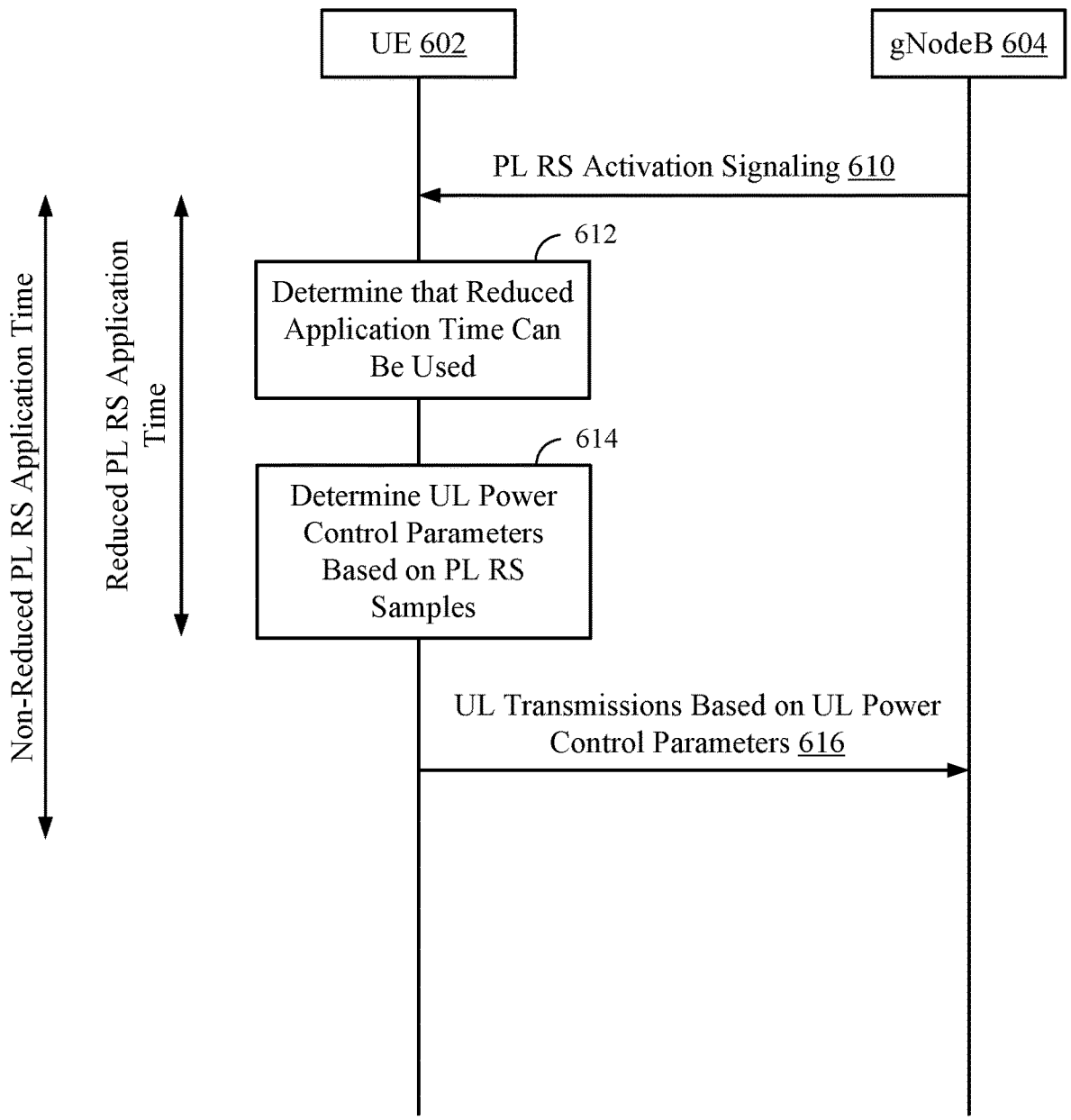
FIG. 6 is a call flow diagram illustrating messages exchanged between a user equipment (UE) and network entities for reducing path loss (PL) reference signal (RS) application time, in accordance with some aspects of the present disclosure.

FIG. 6 is a call flow diagram illustrating an example of reducing a PL RS application time. As illustrated, UE 602 receives PL RS activation signaling 610 from a gNodeB 604. As discussed, the signaling 610 generally indicates that PL RSs will be transmitted by the gNodeB 604 and that the UE is to use the PL RSs to determine, for example, uplink power control parameters for uplink transmissions to the gNodeB 604.

At block 612, the UE determines that a reduced application time can be used for the activated PL RS(s). The UE can determine, for example, that a reduced application time can be used based on a plurality of PL RS measurements or other UE mobility statistics. A reduced application time can be used if a number of PL RS measurements are within a threshold amount of each other, if the UE is stationary or substantially stationary as indicated by one or more location information systems (e.g., NAVSTAR GPS, GLONASS, GALILEO, etc.), or other scenarios in which a UE can determine that a normal application time need not be used in order to determine power control parameters for UL transmissions to the gNodeB 604.

At block 614, the UE determines UL power control parameters based on the PL RS samples. The UE can determine power control parameters based on a same number of PL RS samples taken using a smaller periodicity than taken in a non-reduced PL RS application time period or using a smaller number of PL RS samples taken at a same periodicity as that for PL RSs in the non-reduced application time period. Subsequently, the UE may use the determined UL power control parameters for UL transmissions 616 to the gNodeB 604.

Figure 7:
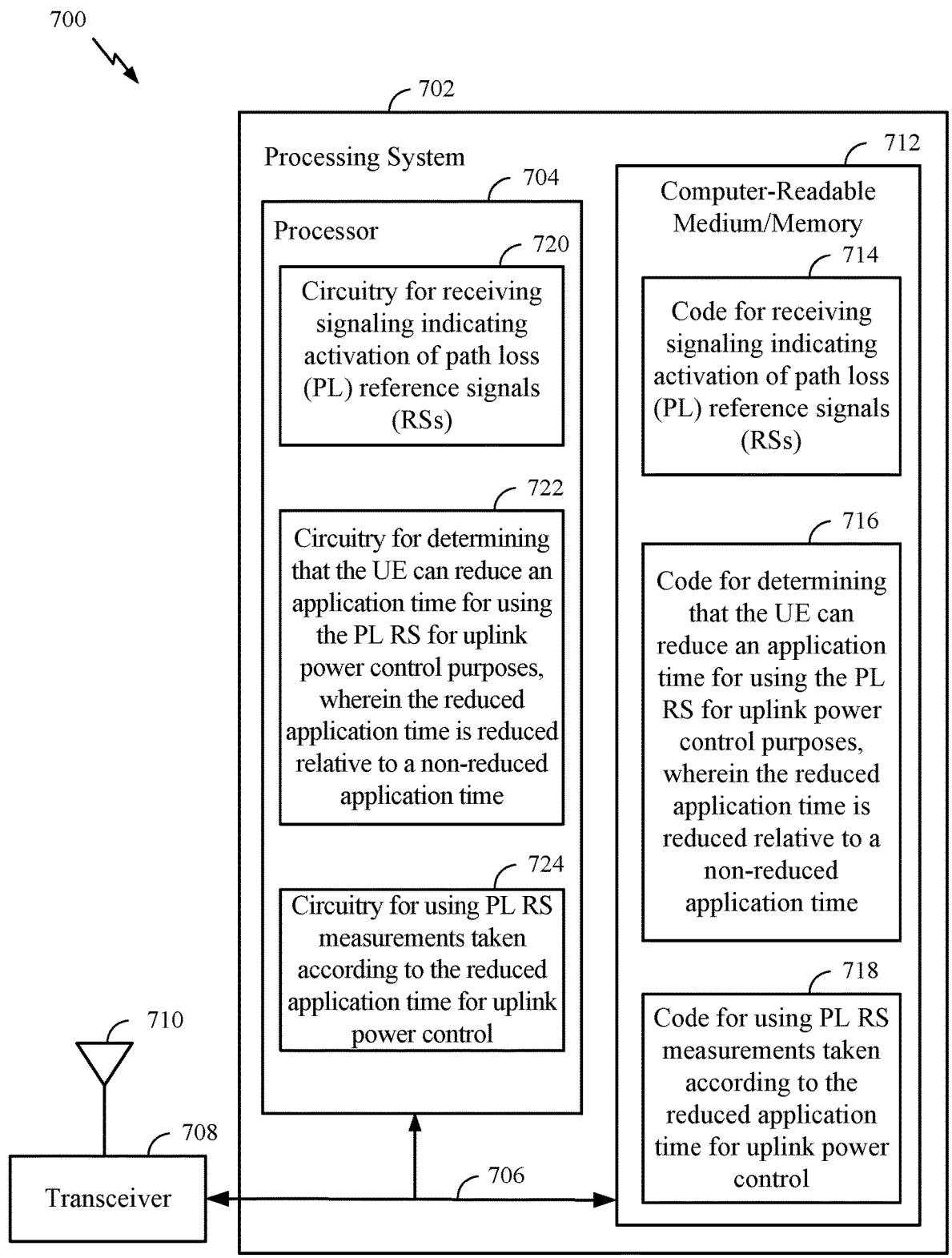
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for reducing a PL RS application time. In certain aspects, computer-readable medium/memory 712 stores code 714 for receiving signaling indicating activation of path loss (PL) reference signals (RSs); code 716 for determining that the UE can reduce an application time for using the PL RS for uplink power control purposes, wherein the reduced application time is reduced relative to a non-reduced application time; and code 718 for using PL RS measurements taken according to the reduced application time for uplink power control, in accordance with aspects of the present disclosure. In certain aspects, the processor 704 has circuitry configured to implement the code stored in the computer-readable medium/memory 712. The processor 704 includes circuitry 720 for receiving signaling indicating activation of path loss (PL) reference signals (RSs); circuitry 722 for determining that the UE can reduce an application time for using the PL RS for uplink power control purposes, wherein the reduced application time is reduced relative to a non-reduced application time; and circuitry 724 for using PL RS measurements taken according to the reduced application time for uplink power control, in accordance with aspects of the present disclosure.

Figure 8:
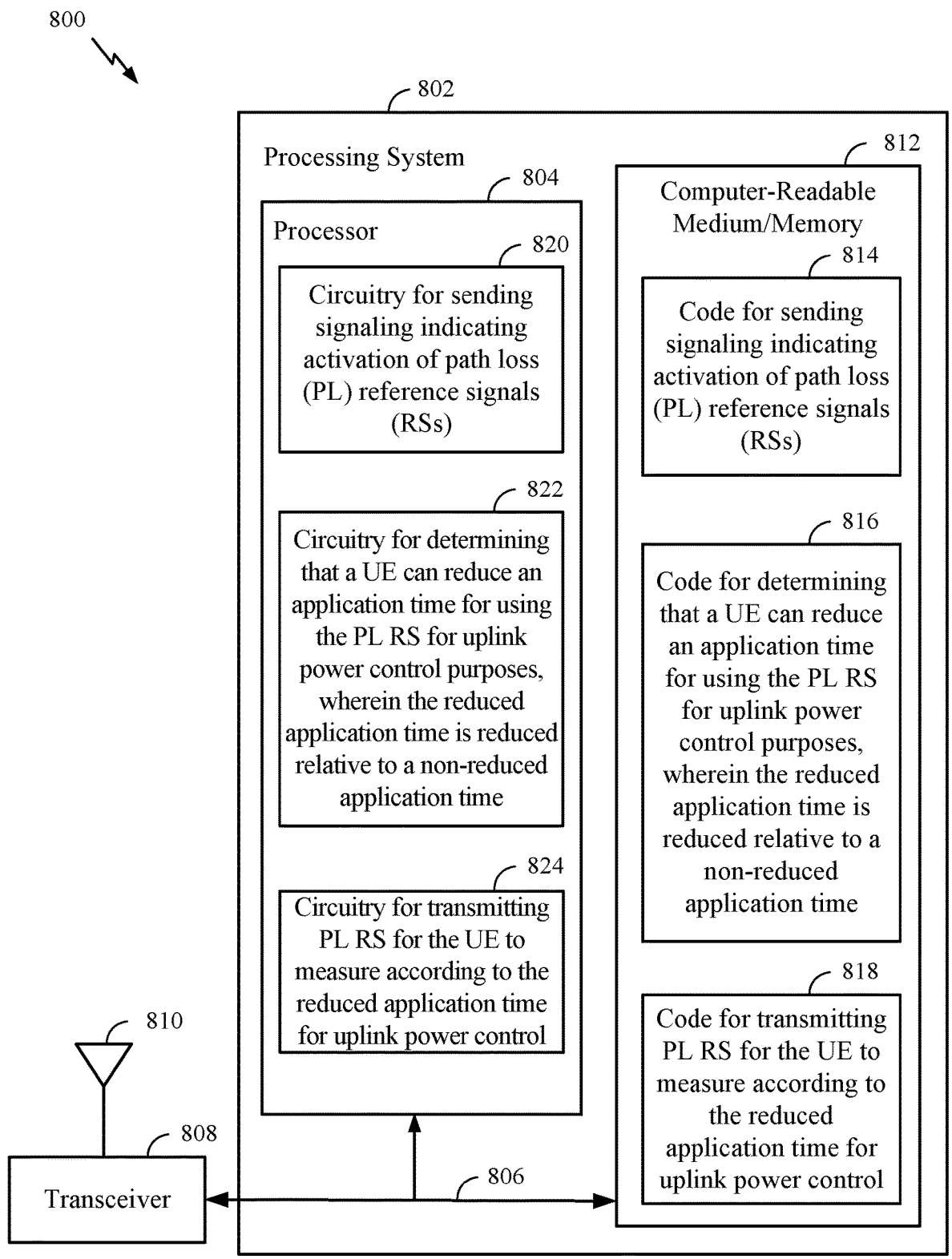
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for reducing a PL RS application time. In certain aspects, computer-readable medium/memory 812 stores code 814 for sending, to a user equipment, signaling indicating activation of path loss (PL) reference signals (RSs); code 816 for determining that the UE can reduce an application time for using the PL RS for uplink power control purposes, wherein the reduced application time is reduced relative to a non-reduced application time; and code 818 for transmitting PL RS for the UE to measure according to the reduced application time for uplink power control, in accordance with aspects of the present disclosure. In certain aspects, the processor 804 has circuitry configured to implement the code stored in the computer-readable medium/memory 812. The processor 804 includes circuitry 820 for sending, to a user equipment, signaling indicating activation of path loss (PL) reference signals (RSs); circuitry 822 for determining that the UE can reduce an application time for using the PL RS for uplink power control purposes, wherein the reduced application time is reduced relative to a non-reduced application time; and circuitry 824 for transmitting PL RS for the UE to measure according to the reduced application time for uplink power control, in accordance with aspects of the present disclosure.

EXAMPLE EMBODIMENTS

Embodiment 1

A method for wireless communications by a user equipment (UE), comprising: receiving signaling indicating activation of path loss (PL) reference signals (RSs); determining that the UE can reduce an application time for using the PL RS for uplink power control purposes, wherein the reduced application time is reduced relative to a non-reduced application time; and using PL RS measurements taken according to the reduced application time for uplink power control.

Embodiment 2

The method of Embodiment 1, wherein the signaling indicating the activation of PL RSs comprises downlink control information (DCI) signaling.

Embodiment 3

The method of Embodiment 1, wherein the signaling indicating the activation of PL RSs comprises media access control (MAC) control element (CE) signaling.

Embodiment 4

The method of any of Embodiments 1 through 3, further comprising receiving signaling configuring the UE with at least first and second periods for transmitting the PL RS, wherein the first period is shorter than the second period and the reduced application time is achieved by measuring PL RS transmitted according to the first period.

Embodiment 5

The method of Embodiment 4, wherein: the UE uses the first period to reduce the application time after activation for a first measurement; and subsequently measures PL RSs transmitted to the UE according to the second period.

Embodiment 6

The method of claim 4, wherein: the UE uses PL RSs transmitted to the UE according to the first period for uplink power control purposes; and the UE uses PL RSs transmitted to the UE according to the second period for one or more purposes other than uplink power control.

Embodiment 7

The method of any of Embodiments 1 through 6, wherein the UE achieves the reduced application by measuring fewer PL RS samples than a number of samples associated with the non-reduced application time.

Embodiment 8

The method of Embodiment 7, wherein the UE determines to use the reduced application time based on at least one of estimated measurement accuracy or mobility of the UE.

Embodiment 9

The method of any of Embodiments 1 through 8, further comprising signaling, to a network entity, capability of the UE to support the reduced application time.

Embodiment 10

The method of Embodiment 9, further comprising signaling, to the network entity, an indication of the reduced application time.

Embodiment 11

A method for wireless communications by a network entity, comprising: sending, to a user equipment, signaling indicating activation of path loss (PL) reference signals (RSs); determining that the UE can reduce an application time for using the PL RS for uplink power control purposes, wherein the reduced application time is reduced relative to a non-reduced application time; and transmitting PL RS for the UE to measure according to the reduced application time for uplink power control.

Embodiment 12

The method of Embodiment 11, wherein the signaling indicating the activation of PL RSs comprises downlink control information (DCI) signaling.

Embodiment 13

The method of Embodiment 11, wherein the signaling indicating the activation of PL RSs comprises media access control (MAC) control element (CE) signaling.

Embodiment 14

The method of any of Embodiments 11 through 13, further comprising sending signaling configuring the UE with at least first and second periods for transmitting the PL RS, wherein the first period is shorter than the second period and the reduced application time is achieved by measuring PL RS transmitted according to the first period.

Embodiment 15

The method of Embodiment 14, wherein: the network entity transmits PL RSs according to the first period to reduce the application time after activation for a first measurement by the UE; and the network entity subsequently transmits PL RSs according to the second period.

Embodiment 16

The method of any of Embodiments 11 through 15, further comprising receiving signaling, from the UE, indicating capability of the UE to support the reduced application time.

Embodiment 17

The method of Embodiment 16, further comprising receiving signaling, from the UE, indicating the reduced application time.

Embodiment 18

An apparatus for wireless communications by a user equipment (UE), comprising: a processor; and a memory having instructions which, when executed by the processor, performs the operations of any of Embodiments 1 through 10.

Embodiment 19

An apparatus for wireless communications by a network entity, comprising: a processor; and a memory having instructions which, when executed by the processor, performs the operations of any of Embodiments 11 through 17.

Embodiment 20

An apparatus for wireless communications by a user equipment (UE), comprising: means capable of performing the operations of any of Embodiments 1 through 10.

Embodiment 21

An apparatus for wireless communications by a network entity, comprising: means capable of performing the operations of any of Embodiments 11 through 17.

Embodiment 22

A computer-readable medium having instructions stored thereon which, when executed by a processor, performs the operations of any of Embodiments 1 through 10.

Embodiment 23

A computer-readable medium having instructions stored thereon which, when executed by a processor, performs the operations of any of Embodiments 11 through 17.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
    receiving signaling indicating activation of path loss (PL) reference signals (RSs);
    determining that the UE can reduce an application time for using the PL RS for uplink power control purposes, wherein the reduced application time is reduced relative to a non-reduced application time;
    using PL RS measurements taken according to the reduced application time for uplink power control; and
    receiving signaling configuring the UE with at least first and second periods for transmitting the PL RS, wherein the first period is shorter than the second period and the reduced application time is achieved by measuring PL RS transmitted according to the first period.

2. The method of claim 1, wherein the signaling indicating the activation of PL RSs comprises downlink control information (DCI) signaling.

3. The method of claim 1, wherein the signaling indicating the activation of PL RSs comprises media access control (MAC) control element (CE) signaling.

4. The method of claim 1, wherein:
    the UE uses the first period to reduce the application time after activation for a first measurement; and
    subsequently measures PL RSs transmitted to the UE according to the second period.

5. The method of claim 1, wherein:
    the UE uses PL RSs transmitted to the UE according to the first period for uplink power control purposes; and
    the UE uses PL RSs transmitted to the UE according to the second period for one or more purposes other than uplink power control.

6. The method of claim 1, wherein the UE achieves the reduced application by measuring fewer PL RS samples than a number of samples associated with the non-reduced application time.

7. The method of claim 6, wherein the UE determines to use the reduced application time based on at least one of estimated measurement accuracy or mobility of the UE.

8. The method of claim 1, further comprising signaling, to a network entity, capability of the UE to support the reduced application time.

9. The method of claim 8, further comprising signaling, to the network entity, an indication of the reduced application time.

10. A method for wireless communications by a network entity, comprising:
sending, to a user equipment, signaling indicating activation of path loss (PL) reference signals (RSs);
determining that the UE can reduce an application time for using the PL RS for uplink power control purposes, wherein the reduced application time is reduced relative to a non-reduced application time;
transmitting PL RS for the UE to measure according to the reduced application time for uplink power control; and
sending signaling configuring the UE with at least first and second periods for transmitting the PL RS, wherein the first period is shorter than the second period and the reduced application time is achieved by measuring PL RS transmitted according to the first period.

11. The method of claim 10, wherein the signaling indicating the activation of PL RSs comprises downlink control information (DCI) signaling.

12. The method of claim 10, wherein the signaling indicating the activation of PL RSs comprises media access control (MAC) control element (CE) signaling.

13. The method of claim 10, wherein:
the network entity transmits PL RSs according to the first period to reduce the application time after activation for a first measurement by the UE; and
the network entity subsequently transmits PL RSs according to the second period.

14. The method of claim 10, further comprising receiving signaling, from the UE, indicating capability of the UE to support the reduced application time.

15. The method of claim 14, further comprising receiving signaling, from the UE, indicating the reduced application time.

16. An apparatus for wireless communication by a user equipment (UE), comprising:
a receiver configured to receive signaling indicating activation of path loss (PL) reference signals (RSs), and configured to receive signaling configuring the UE with at least first and second periods for transmitting the PL RS, wherein the first period is shorter than the second period, and the reduced application time is achieved by measuring PL RS transmitted according to the first period; and
a processor configured to:
determine that the UE can reduce an application time for using the PL RS for uplink power control purposes, wherein the reduced application time is reduced relative to a non-reduced application time, and
use PL RS measurements taken according to the reduced application time for uplink power control.

17. The apparatus of claim 16, wherein the signaling indicating the activation of PL RSs comprises downlink control information (DCI) signaling.

18. The apparatus of claim 16, wherein the signaling indicating the activation of PL RSs comprises media access control (MAC) control element (CE) signaling.

19. The apparatus of claim 16, wherein:
the UE uses the first period to reduce the application time after activation for a first measurement; and
subsequently measures PL RSs transmitted to the UE according to the second period.

20. The apparatus of claim 16, wherein:
the UE uses PL RSs transmitted to the UE according to the first period for uplink power control purposes; and
the UE uses PL RSs transmitted to the UE according to the second period for one or more purposes other than uplink power control.

21. The apparatus of claim 16, wherein the UE achieves the reduced application by measuring fewer PL RS samples than a number of samples associated with the non-reduced application time.

22. The apparatus of claim 21, wherein the processor is configured to determine to use the reduced application time based on at least one of estimated measurement accuracy or mobility of the UE.

23. The apparatus of claim 16, further comprising a transmitter configured to signal, to a network entity, a capability of the UE to support the reduced application time.

24. The apparatus of claim 23, wherein the transmitter is further configured to signal, to the network entity, an indication of the reduced application time.

25. An apparatus for wireless communication by a network entity, comprising:
a transmitter configured to send, to a user equipment, signaling indicating activation of path loss (PL) reference signals (RSs); and
a processor configured to determine that the UE can reduce an application time for using the PL RS for uplink power control purposes, wherein the reduced application time is reduced relative to a non-reduced application time, wherein the transmitter is further configured to transmit PL RS for the UE to measure according to the reduced application time for uplink power control and configured to transmit signaling configuring the UE with at least first and second periods for transmitting the PL RS, wherein the first period is shorter than the second period and the reduced application time is achieved by measuring PL RS transmitted according to the first period.

26. The apparatus of claim 25, further comprising:
a receiver configured to receive signaling, from the UE, indicating capability of the UE to support the reduced application time.

* * * * *